Nov. 28, 1933.    W. FAIRCHILD    1,936,835
BAKED EDIBLE CONTAINER
Filed May 25, 1931

Inventor
William Fairchild,
By his Attorneys,
Fraser, Myers & Manley.

Patented Nov. 28, 1933

1,936,835

UNITED STATES PATENT OFFICE 1,936,835

BAKED EDIBLE CONTAINER

William Fairchild, Albany, N. Y.

Application May 25, 1931. Serial No. 539,722

1 Claim. (Cl. 99—10)

The present invention relates to edible containers and aims to provide certain improvements therein. More particularly it relates to baked pastry containers preferably made of cracker dough adapted to be filled with foodstuff, for example, cheese, jam, etc., and thereby provide in a practicable commercial form the equivalent of crackers and cheese or crackers and jam and the like.

An object of the invention is to provide a container of the character described as an article of manufacture which may be packed and sold for home or picnic consumption and which may be vended already filled with the desired foodstuff or freshly filled to a customer's order at highway refreshment stands, fairs, carnivals and the like.

A further object of the invention is to provide an edible container of the character described which will possess the desired crispness of crackers, and have a receptacle or container portion which will satisfactorily hold its filler contents while the container is being eaten.

The foregoing and other objects of my invention I accomplish by providing a baked pastry container closed at one end and open at its other end, having puffed inner and outer walls so disposed with relation to each other as to form a compartment which is larger at its open end than at its closed end, whereby to facilitate the introduction of the filler substance into the container. My invention also embodies other features of novelty which will be more apparent from the detailed description which follows and considered in conjunction with the accompanying drawing, wherein Figure 1 is a perspective view of an edible container embodying my invention.

Figure 1:
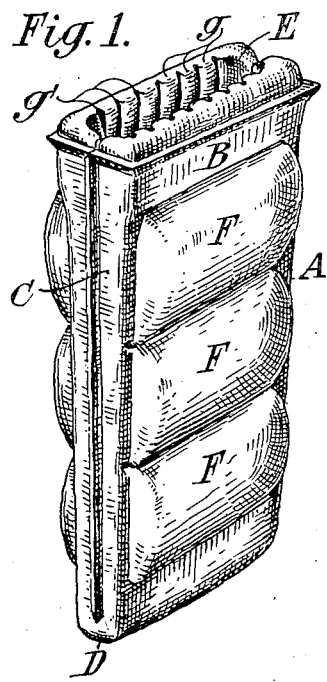
Figure 2:
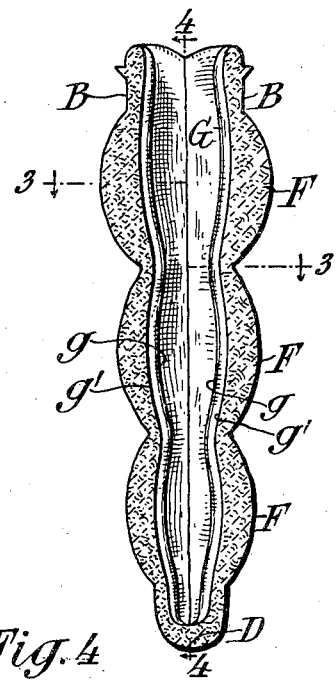
Fig. 2 is a longitudinal section of the container taken substantially along the plane of the line 2—2 of Fig. 3.
Figure 3:
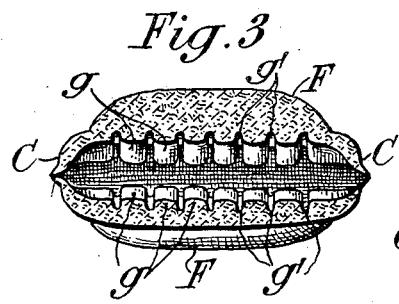
Fig. 3 is a section taken substantially along the planes of the broken line 3—3 of Fig. 2.
Figure 4:
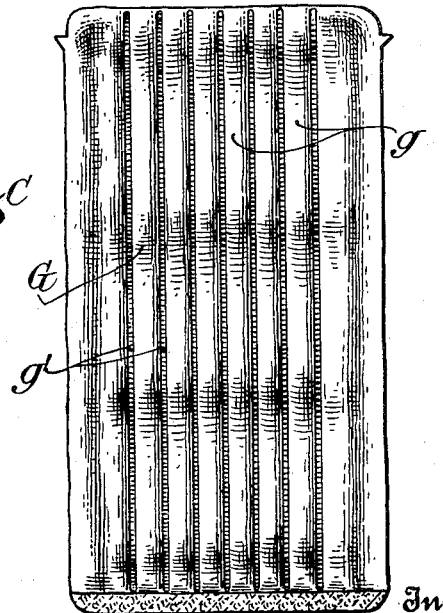
Fig. 4 is a longitudinal section taken substantially along the plane of the line 4—4 of Fig. 2.

Referring to the drawing, let A indicate the container as a whole, which, in the form disclosed, is in the nature of a relatively flat, oblong biscuit having similar front and rear walls B and similar side walls C, said container being closed at one end, as indicated at D, and open at its other end, as indicated at E.

In practice I prefer to form the container from dough containing leaven, such as yeast, baking powder or the like, the dough being of a constituency to produce when baked, a pastry of soda cracker-like structure. It will be obvious, however, that the invention also extends to the use of other forms of dough or batter for producing a container of the character described. The dough from which the container is made may be pre-formed or shaped in any desired manner upon a matrix, mold or otherwise, so that in the baking thereof the walls of the container will be restrained in only a limited manner against expansion due to the escape of gases therefrom, in view of which both the inner and outer surfaces of the container walls will become puffed. Such puffing of the outer faces of the front and rear walls is indicated by the reference character F, and the puffing of the inner surfaces of said walls is indicated by the reference character G. Preferably the puffing of the inner surfaces of the walls is in the nature of longitudinally-extending ribs $g$ which provide effective holding surfaces for the filler material when introduced into the container and prevent the undue spreading of such filler material during the eating of the filled container.

In the embodiment of the invention shown in the drawing, the container A is formed by positioning and holding a sheet of prepared dough over the edges of a plurality of equally spaced, parallelly-arranged, vertically-positioned blades, which are narrower at their tops than at their bottoms, the sheet of dough being held against the edges of said blades by a suitable form which only engages the dough around the edges of the walls and at but a few points intermediate said edges, whereby to permit free expansion or puffing of the outer faces of the container during baking. Inward expansion of the inner surfaces is permitted to take place between the spaced blades during the baking operation. The baking operation being completed, the blades are withdrawn, leaving the grooves $g'$ between the puffed ribs $g$. A container formed in the manner described, in view of the character of the inner blades and the holding frame, will be of substantially wedge-shaped form having a compartment of substantially similar form which is closed at its small end and side walls of the wedge, and open at the large end of the wedge. This construction and form of compartment admirably lends itself to filling the container with any desired foodstuff.

From the foregoing detailed description it will be apparent that I have provided a new article of manufacture of novel form and function and one which fully responds to the objects of the invention as set forth in the opening statement, and while I have shown and described but a single embodiment of my invention I do not wish to be limited to the specific details of construction and form disclosed, since it will be apparent to one skilled in the art that the same may be modified without departing from the spirit of the invention.

What I claim is:

A baked edible container of soda-cracker-like consistency having a relatively flat, oblong compartment which is closed at one end and at its sides, and open at its other end, the walls of said container being puffed on their inner and outer surfaces, the puffs on the inner surfaces providing relatively narrow longitudinal-extending ribs within the container, the puffs on the outer surfaces providing relatively wide ribs extending transversely to the inner longitudinal ribs and the inner walls being bowed outwardly at the rear of the wide ribs on the outer walls.

WILLIAM FAIRCHILD.